Sept. 21, 1954

A. B. SKROMME 2,689,512

STUBBLE PLOW

Filed March 12, 1949

Inventor
ARNOLD B. SKROMME

By Lyon & Lyon

ATTORNEYS

Sept. 21, 1954

A. B. SKROMME 2,689,512

STUBBLE PLOW

Filed March 12, 1949

Inventor
ARNOLD B. SKROMME

By Lyon & Lyon

ATTORNEYS

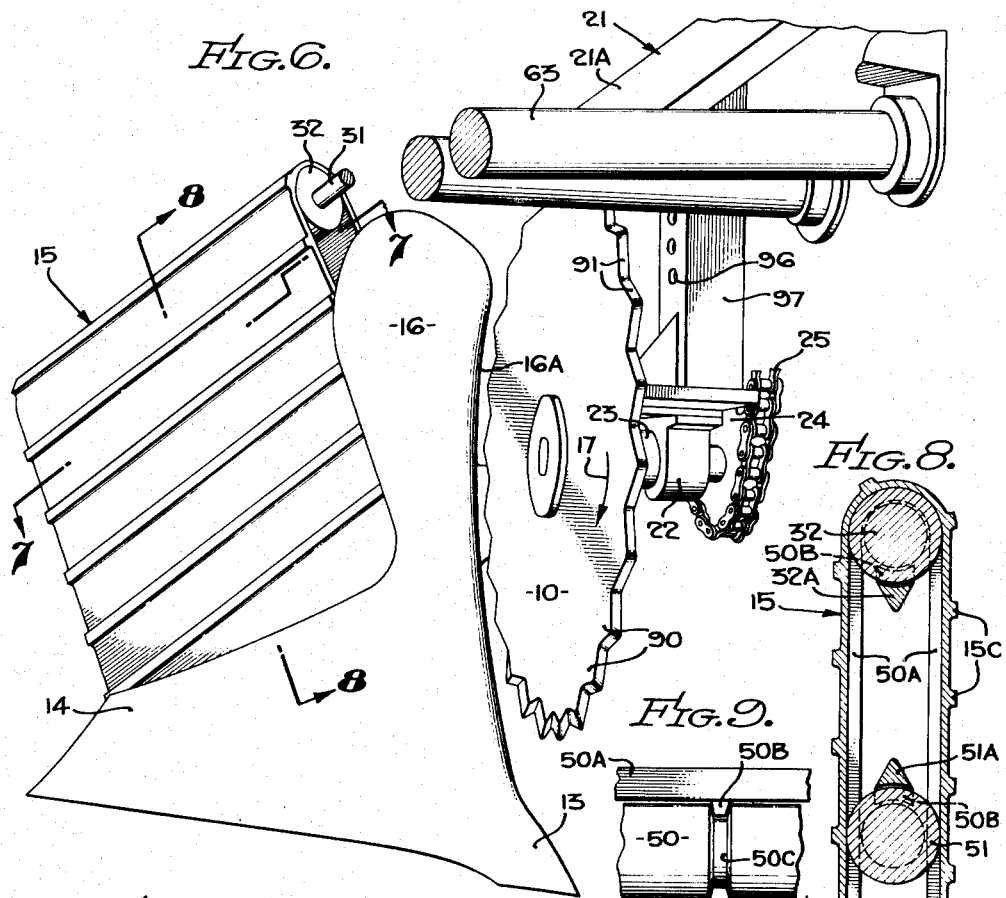

Sept. 21, 1954   A. B. SKROMME   2,689,512
STUBBLE PLOW
Filed March 12, 1949   8 Sheets-Sheet 4
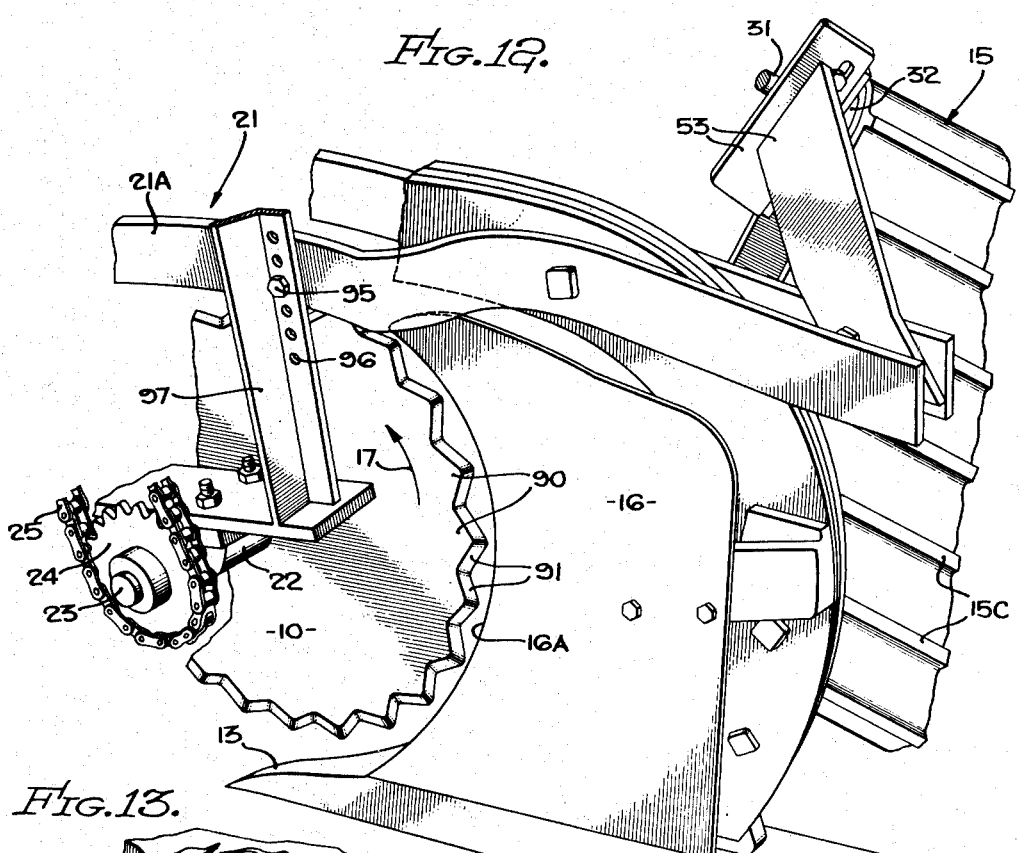
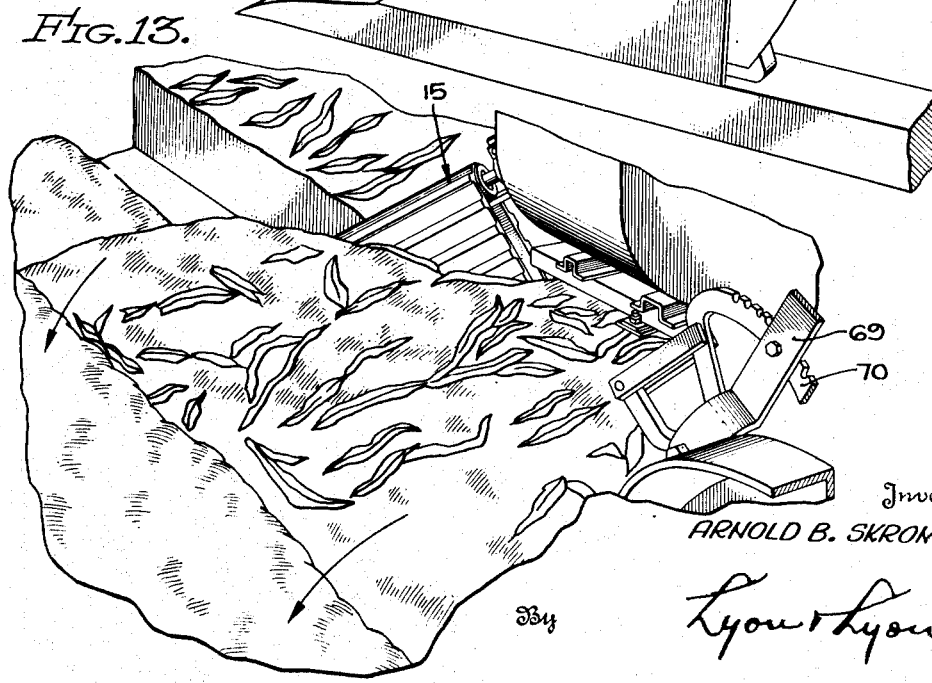
Inventor
ARNOLD B. SKROMME
By 
ATTORNEYS Sept. 21, 1954  A. B. SKROMME  2,689,512
STUBBLE PLOW
Filed March 12, 1949  8 Sheets-Sheet 5

Inventor
ARNOLD B. SKROMME
By Lyon & Lyon
ATTORNEYS

Sept. 21, 1954     A. B. SKROMME     2,689,512
STUBBLE PLOW
Filed March 12, 1949     8 Sheets-Sheet 6
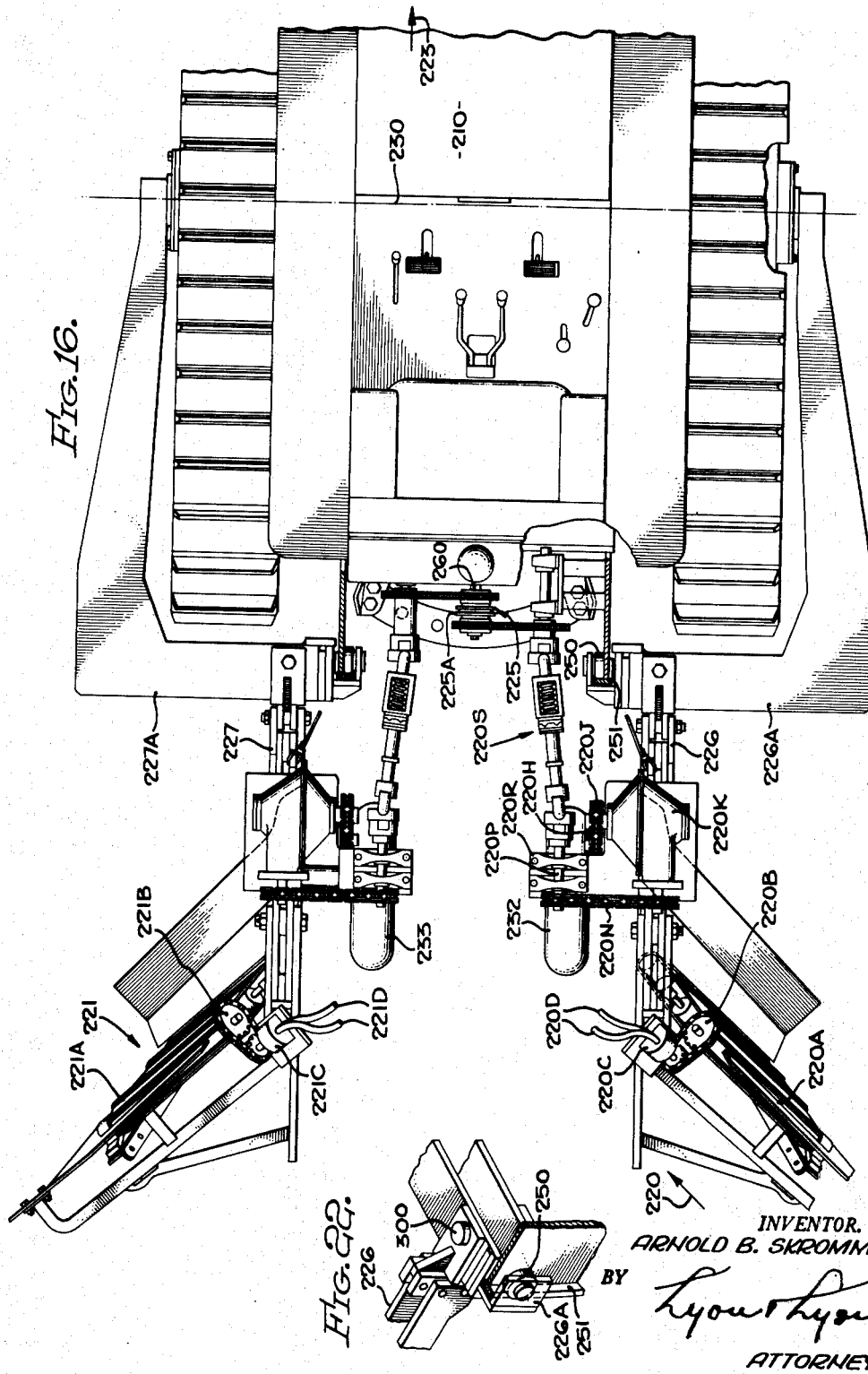
INVENTOR.
ARNOLD B. SKROMME
BY
*Lyon & Lyon*
ATTORNEYS

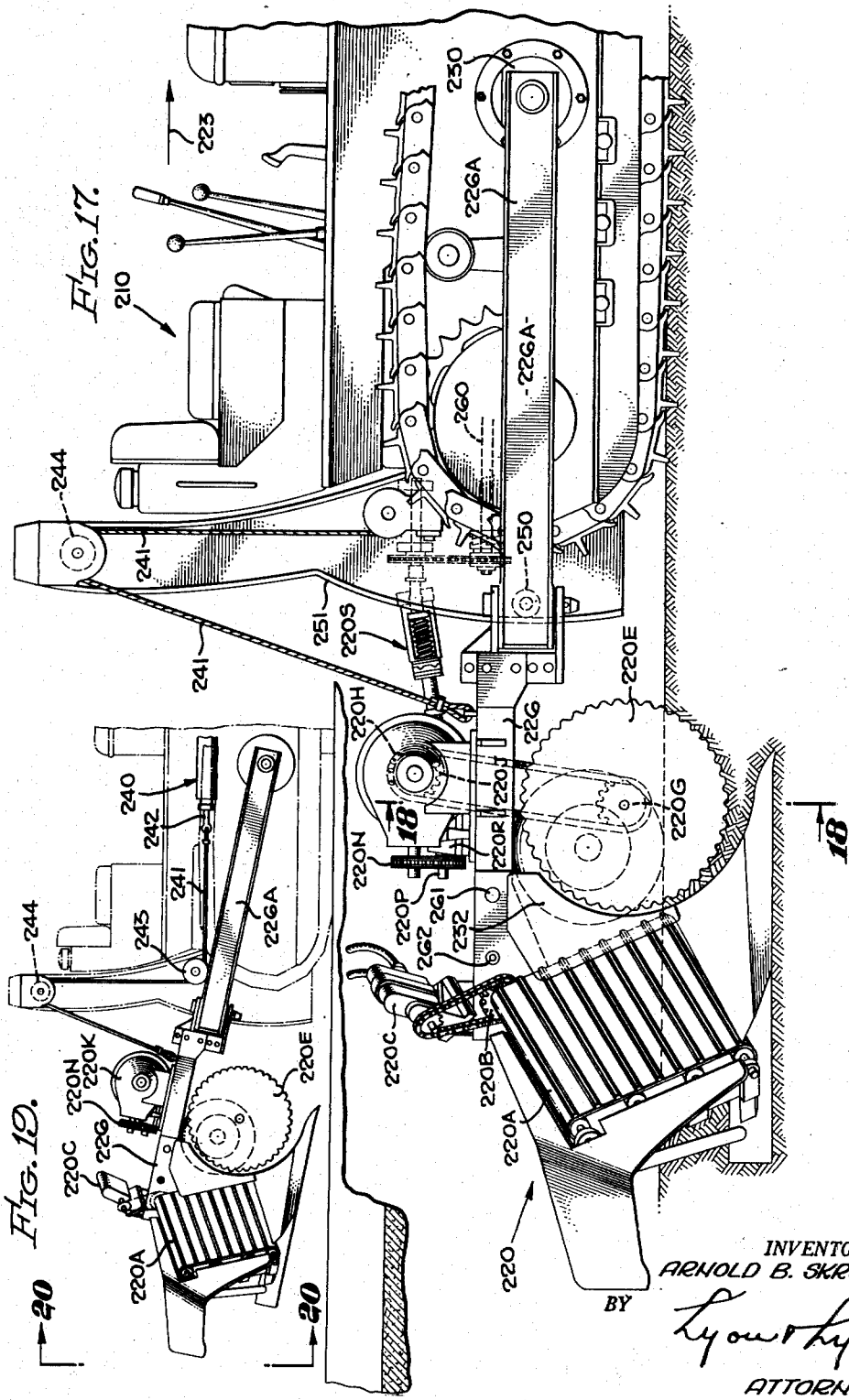

Sept. 21, 1954
A. B. SKROMME
2,689,512
STUBBLE PLOW
Filed March 12, 1949
8 Sheets-Sheet 8
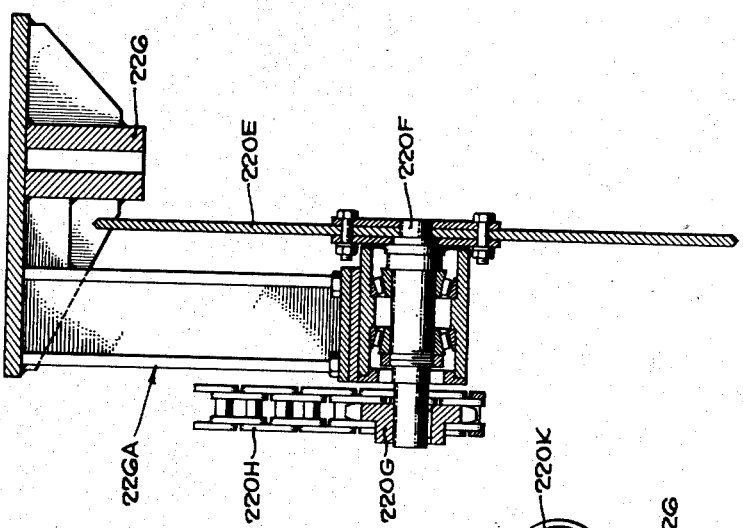
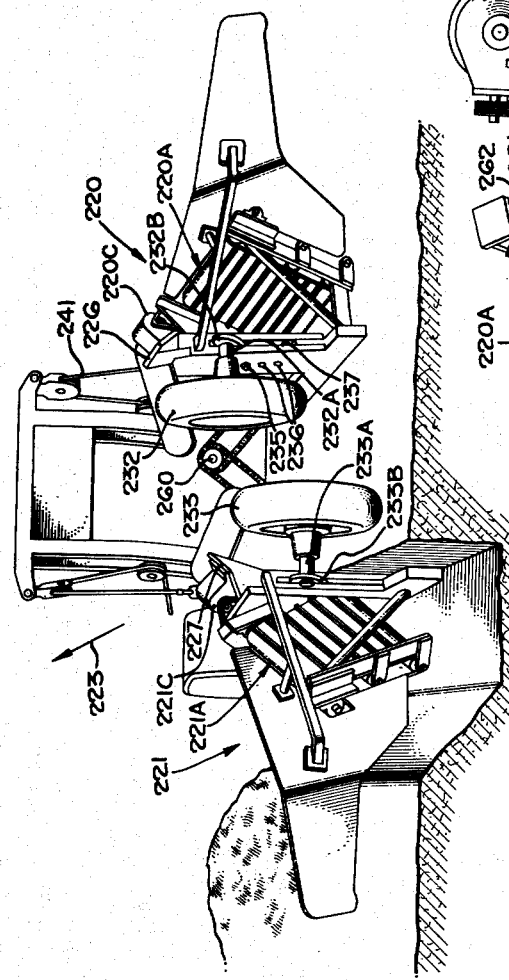
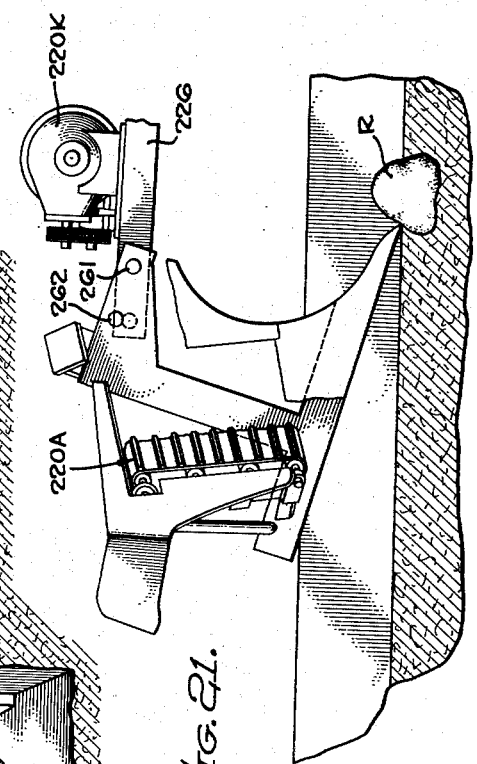
INVENTOR.
ARNOLD B. SKROMME
BY
ATTORNEYS Patented Sept. 21, 1954

2,689,512

UNITED STATES PATENT OFFICE 2,689,512

STUBBLE PLOW

Arnold B. Skromme, Honolulu, Territory of Hawaii, assignor to Pineapple Research Institute of Hawaii, Honolulu, Territory of Hawaii, an association of Hawaii Application March 12, 1949, Serial No. 81,186

4 Claims. (Cl. 97—35)

The present invention relates to plows especially useful in plowing soils sustaining much vegetation, particularly the "nonscouring" soils of the type found in Hawaii with a heavy cover of vegetative growth or plant residue such as pineapple ratoon plants or other debris on the surface thereof. By "nonscouring soils" is meant soils which refuse to slide smoothly on a polished steel moldboard.

Soils in Hawaii, where pineapples are grown, have a high colloidal clay content and a crumb structure of low shearing strength to cause "nonscouring" or high adhesion to ground working implements. Preparation of suitable seed beds in previously harvested pineapple fields is additionally complicated by the amount and type of growth remaining on the field after the pineapples are harvested. The amount of this growth amounts to 50 to 100 tons or even more per acre. In comparison, this amount is approximately four to eight times the weight of a good crop of ensilage corn of the type cut for silage in the Midwestern States.

In accordance with the present day practice of preparing suitable seed beds in previously harvested pineapple fields, it is usually necessary to first, knock down and cut up the old remaining growth or ratoon by the use of a rotary tiller, disc harrow, shredder, pineapple "stump splitter" or other implement many times and then to plow the field from three to seven times with disc plows over a period from four to eleven months to bury the ratoon and other debris under the soil. It is apparent that such customary operations require many man hours, different types of tools, and the expenditure of an excessive number of mechanical horsepower hours over relatively long periods of time during which the pineapples field remains unproductive.

It is therefore an object of the present invention to provide an improved plow with which but only one plowing operation is required during the preparation of a satisfactory seed bed with a relatively small amount of mechanical energy and with the requirement of a relatively small number of man hours thereby conditioning the field in a short time, to permit the productivity over a longer period of the year.

Another object of the present invention is to provide an improved plow which allows reduction of the capital investment in a pineapple plantation.

Still another object of the present invention is to provide an improved plow, the use of which, may effectively increase by approximately 30% the amount of existing acreage now used for growing pineapples.

Another object of the present invention is to provide an improved plow particularly useful in conditioning the soil in previously harvested pineapple fields, but which is not limited in its application, and may have general application in similar types of fields where a heavy vegetative growth or scouring difficulties are encountered.

Another object of the present invention is to provide certain improvements on plows whereby the operation thereof is rendered more effective and efficient in preparing pineapple fields for planting.

Another object of the present invention is to provide an improved plow including a colter and partial moldboard with an associated conveyor moldboard for achieving the above indicated results.

Another object of the present invention is to provide an improved arrangement of a power driven colter with a share and partial moldboard incorporating a power driven endless conveyor moldboard, each cooperating with the other in a novel manner to achieve the above indicated desirable results.

Still another object of the present invention is to provide an improved plow incorporating as two important elements thereof, a power driven colter and a power driven conveyor moldboard which, in accordance with the teachings herein, may both be used in conjunction with a combination share and partial moldboard for achieving the above indicated desirable results.

Another object of the present invention is to provide an improved plow incorporating a colter which is cantilever supported to avoid clogging or jamming of the plow with heavy vegetative growth to obtain the desirable results indicated above.

Still a further object of the present invention is to provide an improved plow having a rotary colter thereon with teeth of predetermined shape on its periphery, the colter being arranged for projection into the soil a predetermined amount in relationship to the predetermined configuration of the teeth to facilitate cutting of heavy vegetative growth to thereby achieve some of the desirable results indicated above.

Yet another object of the present invention is to provide an improved plow characterized by the fact that it incorporates a partial moldboard with an endless conveyor moldboard which depends for its movement on the application of power developed other than by the moving soil in contact with it, and other than movement of the plow itself.

Another object of the present invention is to provide an improved plow incorporating a colter cooperating with a combination soil shield and guide characterized by the fact that such shield guide member serves as an "anvil" against which heavy vegetative growth imperfectly cut initially by the colter in its penetration into the ground may subsequently be pressed for subsequent cutting by the colter, such shield member serving also to prevent soil and trash from going between or beside an associated belt moldboard to, otherwise, cause interference with its movement.

Still another object of the present invention is to provide an improved plow incorporating a colter characterized by the fact that such colter is driven by power supplied other than through ground traction.

The features of the present invention which are believed to be novel are set forth with particularity in the appended claims. This invention itself, both as to its organization and manner of operation, together with further objects and advantages thereof, may be best understood by reference to the following description taken in conjunction with the accompanying drawings in which:

Figure 4 is an enlarged view of the colter shown in Figure 3 to illustrate one possible, but not always obtainable, interrelationship between the configuration of the colter teeth and the depth of penetration of the colter into the ground.

Figure 5 is a sectional view taken substantially on the line 5—5 of Figure 4.

Figure 6 is a perspective view showing in enlarged form some of the elements illustrated in Figure 3, but with the wing moldboard omitted.

Figure 7 is a sectional view taken substantially on the line 7—7 of Figure 6.

Figure 8 is a sectional view taken substantially on the line 8—8 of Figure 6.

Figure 9 is a sectional view taken substantially on the line 9—9 of Figure 8.

Figure 10 is a perspective view of a portion of the scraper element shown in Figure 9.

Figure 11 is a perspective view of a portion of the center of the endless belt shown in Figure 8, a V member either being riveted to a belt although such V may likewise be vulcanized to the belt in its manufacture as shown.

Figure 12 is a perspective view taken substantially in the direction indicated by the line 12—12 of Figure 1.

Figure 13 is a perspective view indicating the manner in which the endless conveyor moldboard moves the soil in an adjacent furrow.

Figures 16 and 17 are views respectively in plan and in side elevation of still another modified arrangement embodying the present invention which may or may not include a wing moldboard of the type shown in Figure 3.

Figure 18 is a sectional view taken substantially on the line 18—18 of Figure 17.

Figure 19 is a view of the plow shown in Figure 17 with the colter moldboard and moving belt assembly moved to raised position for transport purposes.

Figure 20 is a view in perspective taken substantially in the direction indicated by the line 20—20 in Figure 19 of the plow when in operation.

Figure 21 shows portions of the plow illustrated in Figure 17 to indicate the manner in which the plow element may be moved out of harm's way when an obstruction such as a large rock or boulder is contacted.

Figure 22 is a perspective view showing details of the guide structure shown in Figure 16.

Figure 1:
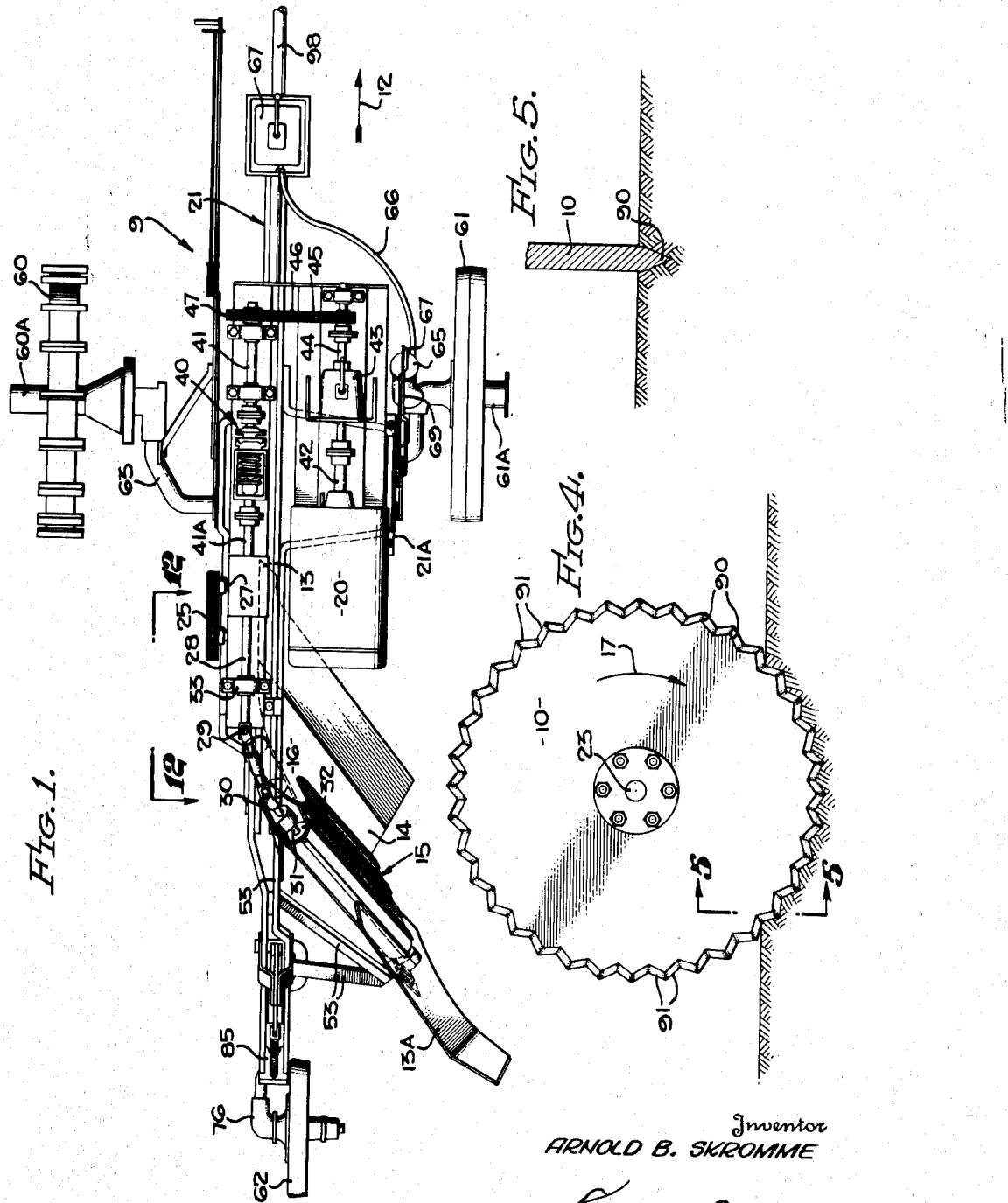
Figure 1 is a plan view of a plow embodying the present invention.

The plow shown in the drawings is of the moldboard type with four principal components:

First, a large, sharp, power-driven, rotatable, flat colter 10 which is arranged to slice, in substantially a vertical plane, through surface debris, ratoon, and plants and which is arranged also to cut into the ground to facilitate the separation of one furrow from another as the plow 9 is pulled through the field by a power unit, such as a tractor in the direction indicated by the arrow 12 in Figure 1; second, a large share 13 and partial moldboard 14 trails behind the colter 10 and digs under the furrow which the colter 10 has previously defined by its cutting. The share 13 and partial moldboard 14 have their ground-engaging work surfaces contiguous and blending one into the other so as to initially produce shearing of the soil in a horizontal plane under such furrow as well as vertically on that part of the landside of the furrow slice which the colter does not reach and simultaneously gradually lifts a furrow slice to a position where it is acted upon by the third component comprising a power-driven endless conveyor moldboard 15.

Figure 3:
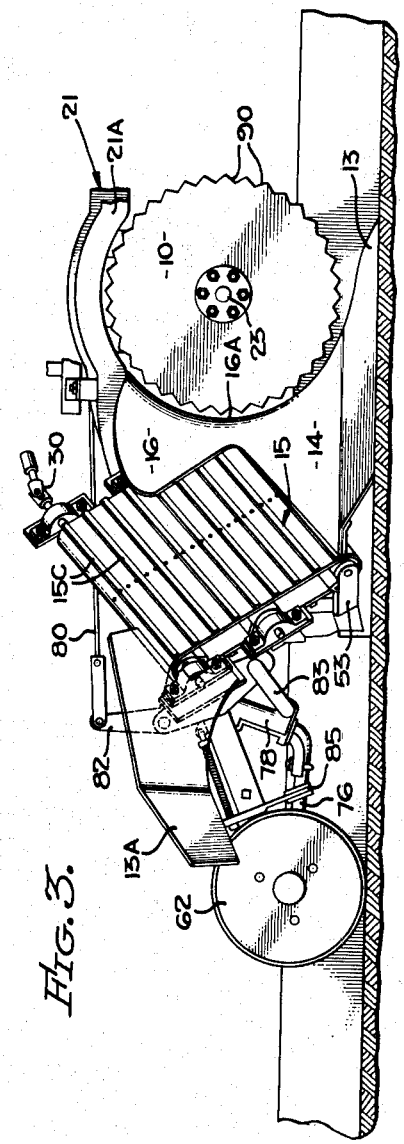
Figure 3 is a view similar to the view shown in Figure 2 but with the chassis, colter, partial fixed moldboard and conveyor moldboard mounted on the chassis shown in lowered position where it is effective for its intended plowing purpose.

The belt 15 may be of fabric reinforced rubber, metal, or other similar suitable material and is arranged to receive the soil as it leaves the combination share-moldboard 13, 14 and to lift such soil upward and outward, in such a manner, that the furrow slice previously made by the action of the colter 10 and combination share-moldboard 13, 14 is turned sufficiently to bury the debris and the ratoon under the soil which was originally beneath such debris and ratoons. In order to facilitate and to assure such movement of soil, a stationary wing moldboard 13A may be mounted as shown in Figures 1 and 3, at the outside upper edge of the path of movement of the belt 15 to deflect and to guide the movement of soil. Also, to assure the upward efficient movement of soils, cleats 15C are affixed to the belt 15.

The fourth component is a combination soil shield and guide member 16 whose outer soil contacting surface is likewise contiguous with and blends into the soil engaging surface of the partial moldboard 14. This member 16 serves to prevent soil from entering in between the loop of the endless conveyor belt 15 and serves also to direct and guide the flow of soil onto the endless conveyor moldboard 15. The particular disposition of this combination shield and guide member 16 is considered to be important. Particularly, the leading edge 16A of this combination shield and guide member 16 lies substantially in the same plane as the plane disk colter 10 with such leading edge, as indicated in Figure 3, being progressively closer to the colter 10 in the direction upward from the ground. In other words, the leading edge 16A of the shield and soil guide member 16 defines with the adjacent periphery of the colter 10 an increasingly diminishing area for a purpose described more fully hereinafter. Briefly, the shield member 16 is, of course, relatively stationary with respect to the moving colter 10 and serves as an "anvil" or shearing member against which imperfectly cut plant and ratoons may be subsequently pressed and sheared as the colter 10 rotates in the direction indicated by the arrow 17 to carry upwardly such ratoon which may be imperfectly cut against the edge 16A. This movement of the colter 10 is independent of the movement of the plow, as would be the case if the colter were moved by ground traction, to thereby allow operation of the colter to free the plow and area of trash when the composite plow is standing still.

An important feature of the present invention is that the colter 10 is power-driven other than by ground traction. For this purpose, the colter is driven by a prime mover such as a gasoline engine 20 mounted on the chassis 21 of the wheel plow 9. While the plow shown herein is mounted on a whel chassis, the plow need not necessarily be mounted on a wheeled chassis but may be mounted on a tractor hitch frame. Likewise, while the drawings show the colter and belt 15, each driven from the prime mover 20, these elements may likewise be driven from a power take-off on the tractor which pulls the plow through the field.

In either one of such cases, the cutting action of the colter 10 is substantially independent of the movement of the plow. Likewise, the movement of the conveyor belt 15 is substantially independent of the movement of the plow and also substantially independent of the movement of the furrow slices contacting it. This independency of movement of the colter and conveyor 15 is considered important because it has been observed that conventional colters driven solely by contact with the soil will not satisfactorily cut through the surface plants and trash to separate or define one furrow from another. This failure to satisfactorily cut through ratoon and surface plants and debris may result in clogging which becomes progressively worse until the plow becomes inoperative and requires cleaning. In pineapple fields, this may occur within a distance of only a few feet.

Thus, for these reasons, it is again repeated that preferably the colter 10 is power driven by either a prime mover or a power take-off on the pulling tractor capable of delivering a relatively large power output, preferably much more than could be conveniently obtained by coupling the colter to ground engaging wheels. Further, the colter is preferably driven by an independent prime mover or a power take-off from the pulling unit because otherwise slippage between the wheels and ground may result in clogging.

Another important feature of the present arrangement resides in the provision and particular disposition of the endless belt 15 with relationship to the share-moldboard 13, 14 and colter 10 and shield member 16. This belt 15 serves not only to overcome the tendency of "nonscouring" soils to stick onto the moldboard 14, but serves also, due to its particular relationship to the share-moldboard 13, 14 and colter 10, to convey and direct the flow of soil originally under the ratoons to a position where such soil is allowed to bury the ratoons and debris in the next adjacent furrow. The soils in the Hawaiian Islands particularly stick to steel moldboards and would otherwise proceed to build up thick layers, thus preventing the furrow being cut from being turned upside down into the next adjacent furrow.

It is appreciated that endless belts, per se, have been used to eliminate the deleterious effects which would otherwise be produced by a "nonscouring" soil on a moldboard, but the endless belt 15, as previously outlined, serves not only this function, but is disposed in relationship to the colter 10 and share-moldboard 13, 14 to obtain the new desirable results mentioned hereinabove. This belt 15 may be driven by any one of the following means which are set forth herein as examples: (1) an auxiliary engine, mounted either on the plow or tractor, (2) a power take-off from the tractor pulling or carrying the composite plow, (3) hydraulic motors, or (4) electric motors. The colter 10 likewise may be driven by any one of these means.

The colter 10 is supported as a cantilever in bearing member 22. The shaft 23 of the colter extends through this bearing 22 and has mounted thereon the sprocket 24 over which the endless chain 25 passes. The endless chain 25 is driven by the sprocket 26 on the power-driven take-off shaft 27 of the gasoline engine 20.

Another power take-off shaft 28 of the unit 20 is coupled through universal joints 29 and 30 to the shaft 31 of the belt driving roller 32. Shaft 28 may be supported for rotation in the bearing member 33 on the chassis 21. Of importance is that the drive for both the colter 10 and belt 15 is disposed out of the path of the moving soil, it being noted that one side of the colter 10 is free from shaft supporting elements and such one side of the colter is adjacent the partial moldboard 14 and belt 15, between which elements there is free space within which there is no likelihood that ratoon imperfectly cut by the colter 10 may become jammed or clogged. For this reason, the cantilever support of the colter is preferred. Possibly, such imperfectly cut ratoon may become jammed between the colter 10 and the shield 16, but since the leading edge of the shield 16A is in the same plane as is the plane of the disk colter, the edge 16A serves as a shearing edge against which such imperfectly cut ratoon may subsequently be completely cut.

In order to prevent damage when large rocks or stones become jammed between the colter and the share-moldboard 13, 14, or shield 16, a conventional type of slip clutch 40 is provided between shaft 41 and shaft 41A. Shaft 41 is driven directly by the output shaft 42 of the prime mover 20 through a speed control transmission 43, shaft 44, chain sprocket 45 on shaft 44, endless roller chain 46 and chain sprocket 47 on shaft 41, the shafts mentioned being journalled for rotation in suitable bearings on the frame or chassis of the plow.

The belt 15 is driven by the roller 32 and passes over the end guide roller 50 and intermediate guide roller 51, each one of the rollers 32, 50 and 51 being journalled for rotation in suitable bearings mounted on suitable bolted frame extensions 53 forming a box framework disposed behind the belt and out of the path of moving soil. This box frame is made up of the bolted frame extensions 53 and supports the endless belt 15 with their rollers 32, 50 and 51 tilted downwardly approximately 35° and inclined backward approximately 43° from the line of travel. The wing moldboard 12A may be bolted or welded to such box framework.

It is noted that the center roller 51 serves to take a considerable amount of the thrust of the soil to prevent undue strain on the belt 15. Also the center roller 51 assists greatly in guiding and keeping the belt on the rollers. Preferably three rollers 32, 50, 51 are thus used although a greater number than three rollers may also be used.

The chassis 21 includes as an element thereof the plow beam 21A, upon which, in fact, the cradle 21B for the prime mover 20 is mounted.

Figure 2:
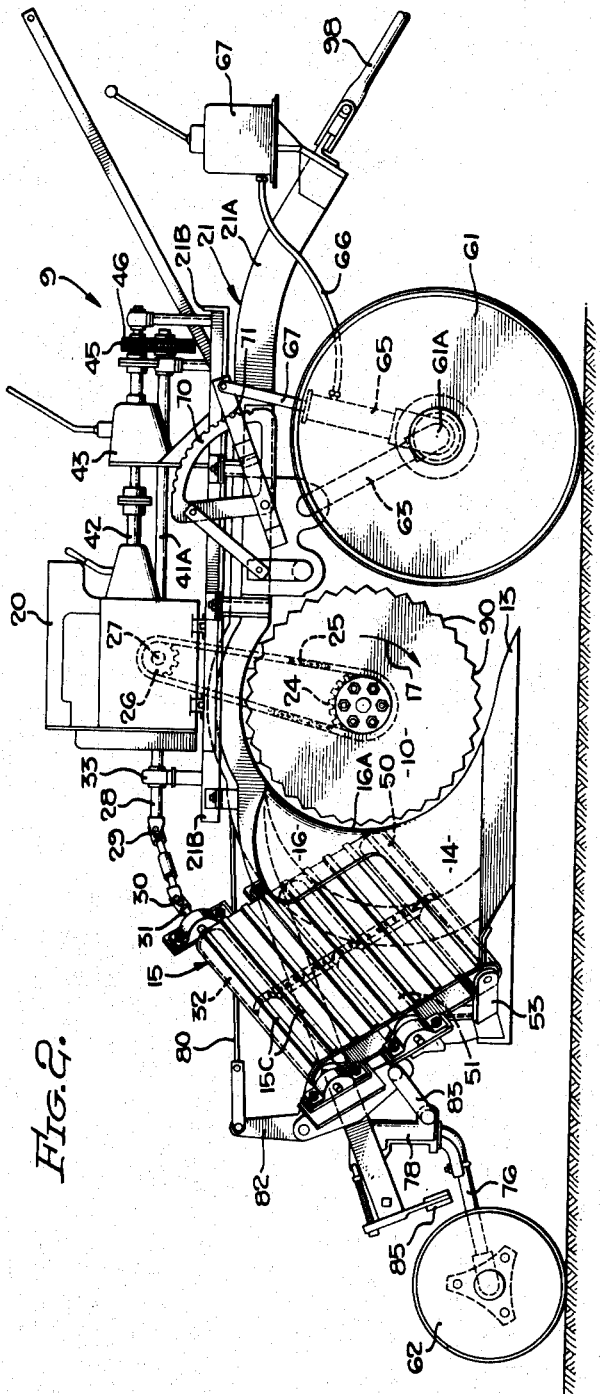
Figure 2 is a view in side elevation of the plow shown in Figure 1 with the chassis of the plow, colter, partial fixed moldboard and conveyor moldboard mounted thereon shown in raised position for transporting over highways, but with the wing-moldboard structure shown in Figures 1 and 3 omitted in order to see structure in greater detail in Figure 2.

As mentioned previously, the chassis 21, including the beam 21A, may be mounted on a tractor hitch frame. As shown herein, the beam is supported on two front wheels 60, 61 and a rear wheel 62. The beam 21A may be moved from an elevated position with respect to the ground shown in Figure 2 to a lowered position shown in Figure 3 by conventional means which form per se, no part of the present invention.

The wheels 60, 61 are mounted on a pair of axles 60A, 61A which are joined by a connecting bridge or crank member 63 which in turn is journalled for rotation in extension on the chassis 21. This crank member 63 may be rotated to raise and lower the chassis for plowing depth adjustment by applying fluid under pressure to the fluid cylinder 65 through flexible conduit 66 from the fluid pump and control means 67 mounted on the beam 21A. The housing of the fluid cylinder 65 may be pivotally mounted on the wheel shaft 61A while the piston 67 may be attached to an arm 69 pivoted on the beam 21A.

The arm 69 may be held in adjusted position by a toothed sector 70 mounted on the chassis 21 in conventional manner.

The rear wheel 62 is supported on an arm 76 which is bent at one end to form an axle for the wheel 62 and is bent vertically at its other end and journalled for rotation in bearing member 78 which is pivotally mounted on an extension of beam 21A. The angular position of the bearing member 78 may be controlled by a manually operable control rod 80 which is attached through crank members 82 and 83 to the housing 78 to change its orientation with respect to the vertical, thereby to change the height of the chassis with respect to ground, the crank members 82, 83 being pivotally mounted with respect to the chassis. A forked extension 85 is provided on the end of the extension of the beam 21A to straddle the rod 76 to thereby maintain the wheel 62 oriented in a straight ahead direction in the position shown in Figure 3.

Preferably, the colter 10 is V-notched on its periphery with the inner edges of each V-notch beveled to form teeth 90 having a sharp cutting edge, the V-notches each having an equal included angle denoted by the reference character 91. The particular shape of the V-notches and teeth 90 are preferably as shown in the drawings.

The sharpened teeth 90 of the colter 10 draw the material to be cut against them on the ground with the forward tips of the colter teeth rotating downward as indicated by the arrow 17.

While the present invention may be practiced with the use of a toothless, smooth, power-driven colter, it is preferred, as shown herein, to make the included angle 91 of the V-notch such that a practically self-cleaning tooth results. This included angle of the V-notch and the normal penetration of the colter in the ground are each such and interrelated that the beveled edge of the V-notch of the tooth being withdrawn from the ground extends in a substantially vertical plane. The depth of penetration of the colter is preferably 5" to 7".

It has been observed if the included angle 91 of the V-shaped notch or tooth were enlarged to make the tooth "sharper," it would form a "pocket" to hold and carry trash up off the ground. On the other hand, if such included angle 91 were made smaller, the V-shaped notch or teeth thus provided are not as effective in pulling trash against the ground on the front side as the colter enters the soil.

The depth of colter penetration, although adjusted preferably as indicated above with respect to the plane of the ground, is adjustable and its particular adjustment may depend on the amount of trash, hardness of soil, depth of plowing, moisture content of soil and so forth. Also, it may be desirable to change the shape and number of colter teeth to better suit various conditions such as rocky fields, etc., for it has been observed that smaller teeth are damaged less by rocks.

The colter 10 is adjustably held on the beam 21A by releasable bolts 95 (Figure 12) passing through one of a plurality of adjustment holes 96 in the colter shaft supporting member 97.

Preferably, the colter is adjusted with respect to the leading edge 16A of the shield 16 so that the distance between edge 16A and the colter does not exceed one inch at the bottom, and this distance tapers until the shield edge 16A nearly touches the colter at the top. Thus, any ratoon which may be picked up from the ground is sheared off along such edge 16A and not allowed to pass up between the colter 10 and the beam 21A. Preferably, the beam 21A is spaced as far as possible from the colter 21A to prevent clogging of material between these two elements.

The colter may have a diameter of 27" and a speed of 75 revolutions per minute, while the plow moves at a speed of 2½ miles per hour.

The speed of the endless belt 15 may be approximately 320 feet per minute with its forward face moving upwardly, while the plow moves forwardly at the same speed of 2½ miles per hour.

Even though a shield 16 is provided, there is a possibility that soil may yet enter the closed belt 15, and unless some provisions are taken to maintain the rollers 32, 50, and 51 free of such soil, the belt may soon become inoperative. For this reason, the rollers 32, 50 and 51 are each provided with a scraper 32A, 50A and 51A, respectively, which are supported at their ends on the box frame which rotatably supports such rollers. As shown in Figures 8, 9 and 10, these scrapers may comprise V cross section members having V-shaped projections, such as projection 50B thereon extending into the V grooves 50C in the corresponding rollers. The purpose of these V grooves in the individual rollers 32, 50 and 51 of the type shown at 50C in Figure 9 is to provide a means for preventing lateral movement of the belt 15. For this purpose, as shown in Figure 11, the belt 15 has riveted or vulcanized thereto an internal V-shaped strip 15A arranged to enter such grooves 50C, as shown in Figure 7. Instead of merely one of such strips 15A, the belt may be provided with a plurality of such strips, namely, five, as shown in the modified structure in Figure 7. These scrapers 32A, 50A, and 51A therefore are not only effective to scrape the upper surface of the corresponding rollers 32, 50 and 51 but also the grooves in the rollers which accommodate the belt strips 15A.

Figure 14:
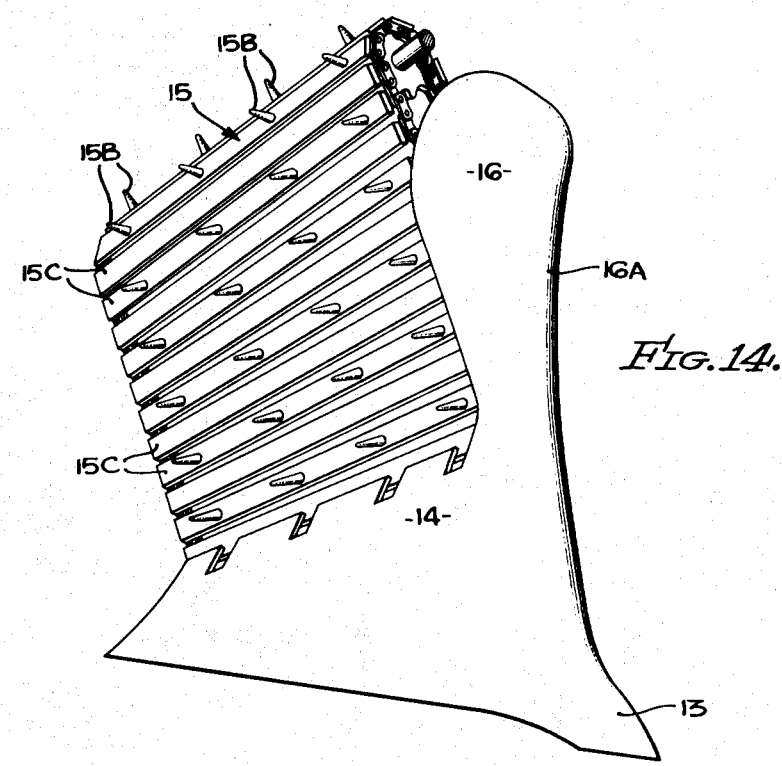
Figure 14 is a perspective view of a modified moldboard with a modified power driven conveyor moldboard mounted thereon, the view being taken in the same angle as is the view shown in Figure 6.

Referring to the modified structure shown in Figure 14, the modified belt 15 has riveted thereto a plurality of transversely extending slats 15C, each of which has extending therefrom a plurality of fingers 15B. In all other respects, the combination share-moldboard and share structure 13, 14, 16 is identical and cooperates with the other elements of the plow in the manner described above. The purpose of the modified belt arrangement in Figure 14 is to cause the furrow strip not only to be turned over but to also cause such furrow strip to be broken up simultaneously by the fingers 15B. In other words, the power-driven belt in Figure 14 not only turns the furrow strip but breaks it up as well.

While a belt of the type shown in the drawings is preferred, it is considered that other similar types of conveying means may be used for the same purpose. For example, such means may comprise a belt as shown, a conveyor, an endless apron or like structures.

As indicated above, the plow, instead of being wheeled and drawn by the tongue member 98, may be mounted in a tractor hitch frame operated hydraulically or mechanically and the belt and colter driven through a power take-off shaft from the engine of the tractor. Further, the plow may comprise a plurality of units as shown herein in multiple units "or bottoms" and may include both righthand and lefthand units arranged alternately. These constructions are shown in the modified structures described hereinafter.

In the modified structure embodying the preferred form of my invention, in Figures 16–22 inclusive, a pair of right and left plow elements 220, 221 are mounted respectively on opposite sides of a tractor 210 which normally travels in the forward direction indicated by the arrow 223. Only one of the plow elements 220, 221 is in operative position at one time in plowing operations, the other one of the plow elements 220, 221 being maintained in an elevated position as clearly shown in Figure 20. When the tractor moves to and from the fields and along highways both of the plow elements 220, 221 are maintained in raised position.

The assembly shown in Figures 16–22 inclusive thus includes a righthand plow 220 mounted on the righthand plow frame 226, and a lefthand plow 221 mounted on the lefthand frame 227. These plow frames 226, 227 are releasably connected to the tractor hitch frames 226A, 227A respectively in the manner shown in Figure 22 by the removable pin 300.

Both right and lefthand plow elements are exactly the same except for their location and position, the plow elements being minor images of each other; and only one of these plows 220, 221 is operated at a time. For example, as the righthand plow traverses the field, throwing a furrow to the right, the left hand plow element 221 is carried in a raised position and does not operate. When the machine reaches the end of the field the righthand plow element 220 is raised out of the ground, the machine is turned squarely around and the lefthand plow element 221 is dropped into the ground. Thus, as the tractor 210 moves back across the field it travels in the opposite direction but the furrow is still being thrown in the same direction relative to the field, to thereby throw the soil in one direction, to thereby eliminate dead furrows and head furrows.

The fact that these two plow elements 220, 221 are mounted directly on the tractor 210 and driven thereby renders it easier to turn at the ends of the furrows, and provides good stability and ease of handling, and also greater ease of applying power from the tractor 210 to the individual plow elements 220, 221 to drive their individual colter and belt.

In the arrangement shown in Figures 16–22 inclusive the individual colters, moldboard belts, moldboards, and moldboard wings or guide members are mounted on their corresponding frame members 226, 227 in the manner described in the other modifications hereinabove. For that reason it is believed that details of the construction and mounting of these elements need not be described at this time.

The belt moldboards 220A, 221A of the elements 220, 221 are each respectively provided with a sprocket wheel 220B, 221B arranged to be driven by a corresponding fluid motor 220C, 221C. Fluid under pressure to these motors 220C, 221C for purposes of driving the moldboard belts may be of conventional type with the fluid conducted to such motors through corresponding flexible conduits 220D, 221D.

The colters 220E, 221E of the righthand and lefthand plow elements 220, 221 may be selectively placed in driving connection with the power take-off shaft 260 of the tractor 210 through the clutch 225. The clutch 225 is of conventional type with its central portion 225A movable to extreme positions wherein on the one hand the righthand colter 220E may be driven by power from the take-off shaft 260 or, on the other hand, the lefthand colter 221 may be driven by power from the same shaft 226. It is noted that when one of the colters 220E, 221E is being driven the other colter, as the case may be, is stationary. Also, in a neutral position of the clutch elements 225A, neither one of the colters is driven, as for example, when the machine travels along a road.

Since each of the colters 220E, 221E is driven in the same manner, detailed description of the drive for colter 220E suffices to describe the drive associated with the other colter 221E.

One of the features of such drive is that it allows the plow elements 220, 221 to be moved from a raised position indicated in Figure 19 to a lowered position shown in Figure 17. The colter 220E (Figure 18) is mounted on the shaft 220F, which is rotatably supported on the frame 226, and which carries a sprocket 220G over which the chain 220H passes. The chain 220H is driven by the sprocket 220J (Figure 16) mounted on the output shaft of the gear reduction unit 220K. The input shaft of such unit 220K carries a sprocket over which the driving chain 220N passes. This chain 220N also passes over a driving sprocket mounted on the shaft 220P which is journalled for rotation in the bearing 220R mounted on the frame 226. This shaft 220P is in driving connection with the power take-off shaft 260 through the combination slip clutch universal joint and telescoping drive assembly which has the general reference numeral 220S.

The plow elements 220, 221 are thus mounted on the frames 226, 227 which, in fact, may be hitch frames of standard construction and which are pivotally mounted on the crawler tractor 210 about the axis designated by the reference numeral 230 in Figure 16. These frames 226, 227 are thus essentially cantilever supported members and each carries at its free end a rotatably supported ground engaging wheel 232, 233 respectively, as clearly indicated in Figure 20.

These wheels 232, 233 may be adjustably supported to vary the depth of penetration of the individual plow elements 220, 221 in the ground. For this purpose the axles 232A, 233A respectively are mounted on the free end of pivoted arms 232B, 233B. The free ends of such arms 232B, 233B may be clamped at different adjusted heights by a fastening bolt 235 passing through one of the adjustment apertures 236 and an aperture in the corresponding arm 232B, 233B. It is noted that there are a plurality of such apertures 236, and that only one is used at a particular time. In order to prevent undue movement along the longitudinal axis of the axle 232A, the arm 232B travels in a guide slot 237 on frame 226. These pivoted frames 226, 227 with their corresponding plow elements 220, 221 mounted thereon may be moved to a raised position by the hydraulic means 240 and associated cable 241. The cable 241 is affixed to the piston element 242 which conventionally may be controlled by fluid pressure. The cable 241 thus attached to piston element 242 passes over the idler rollers 243 and 244 (Figure 19) and is attached to corresponding pivoted hitch frames 226, 227. The idler or guide rollers 243, 244 are rotatably supported on a relatively stationary portion of the tractor 210.

In order to prevent undue swaying of the frames 226, 227 in transit, and to provide guided movement thereof, the tractor hitch frames 226A, 227A have mounted thereon a roller 250 (Figures 16 and 22) adapted to confine the arcuate shaped roller guide 251 within the box frame shown in Figure 22, formed by the roller 250 and frame member 226A, upon which the roller 250 is rotatably supported. The arcuate guide member 251 is stationarily mounted as shown in Figure 17 on the crawler tractor 210 and forms also a supporting member for the cable idler or guide wheel 244.

As mentioned previously, the colter moldboard, moldboard belt and moldboard wing or guide member are supported as a unit on individual frame members 226, 227; however, provisions are made for relative movement of the moldboard assembly with respect to the colter, as indicated in Figure 21, when the moldboard contacts a large rock or boulder which otherwise might cause damage. For this purpose, the moldboard assembly is normally pin connected to the frame 226 by the pins 261, 262 (Figures 21 and 17). The pin 262, however, is relatively weak and is unable to withstand large shear forces with the result that when the moldboard hits an obstruction, as indicated in Figure 21, the pin 262 breaks or snaps to allow subsequent pivotal movement of the moldboard assembly about the axis of the other pin 261.

Then, in order to resume operation, the obstruction designated by the reference numeral R is avoided and a new breakable pin 262 is inserted through the aligned holes in the end of the frame 226 and the moldboard assembly.

Figure 15:
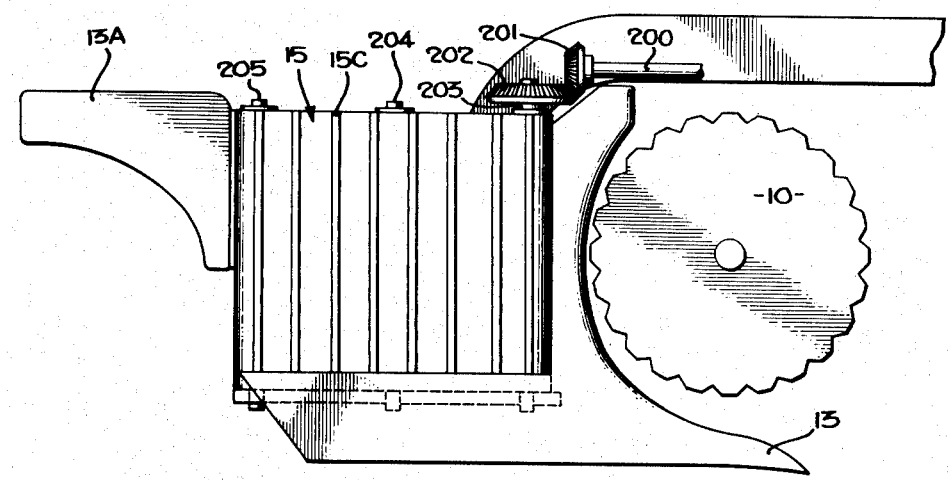
Figure 15 is a view in side elevation of another modified arrangement embodying the present invention.

Returning to the modification shown in Figure 15, it is noted that the belt 15 is driven by the horizontal shaft 200 through the gears 201, 202. The gear 202 is mounted on the vertical shaft 203, which is in driving engagement with the belt 15 to drive the belt over the guide rollers 204, 205. In comparing the belt 15 shown in Figure 14 with the belt 15 shown in Figure 15, it is noted that the belt 15 in Figure 15 has substantially no vertical component of movement but serves mainly to propel the soil, debris and the like rearwardly in the direction toward the wing moldboard 13A.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a plow of the character described for conditioning soil having a thick vegetative growth thereon, a power-driven colter, a share and partial moldboard arranged to lift and to turn a strip of soil previously defined by the cutting action of said colter to form a furrow, an endless conveyor moldboard arranged to receive a strip of soil as it comes up from the share and partial moldboard and to carry it upward and outward to deposit it upside down in an adjacent furrow, a combination shield and guide member between said colter and said partial moldboard and conveyor moldboard, said shield member having a leading edge aft of said colter and lying substantially in the plane of rotation of said colter and with said edge spaced progressively closer to the periphery of said colter as said leading edge extends progressively upwardly from the ground.

2. In a plow of the character described for cutting through thick pineapple ratoon, a power-driven colter, soil plowing and directing means disposed aft of said colter, a shield and soil guide member disposed between said colter and said last-mentioned means having a leading edge aft of said colter and lying substantially in the plane of said colter and with said edge being spaced progressively a closer distance to the periphery of said colter as said leading edge extends progressively upwardly from the ground whereby any ratoon imperfectly sheared by said colter is carried upwardly into an increasingly diminishing area defined by said colter and leading edge so that said shield member serves as an anvil against which such imperfectly sheared ratoon may be subsequently sheared.

3. In a plow of the character described, a tractor, a frame mounted on said tractor, means pivotally mounting said frame on said tractor, cooperating guide means between said frame and said tractor to prevent side sway of said frame and to guide said frame in its pivotal movement; said tractor having a power take-off shaft, an assembly comprising a colter, a moldboard and a belt moldboard mounted as a unit on said frame, a driving connection between said colter and said power take-off shaft, said driving connection being adapted to allow relative movement of said frame with respect to said tractor, said moldboard and belt moldboard being pivotally mounted as a sub-assembly on said frame, frangible means attaching said subassembly to said frame to thereby normally prevent rotation of said sub-assembly on said frame, said frangible means being readily broken when said moldboard strikes an obstacle such as a boulder, to thereby allow subsequent pivotal movement of said sub-assembly.

4. In a plow of the character described, a tractor, a frame mounted on said tractor, means pivotally mounting said frame on said tractor, said tractor having a power take-off shaft, an assembly comprising a moldboard and belt moldboard mounted as a unit on said frame, a driving connection between said belt moldboard and said power take-off shaft, said driving connection being adapted to allow relative movement of said frame with respect to said tractor, said moldboard and belt moldboard being pivotally mounted as a sub-assembly on said frame, frangible means attaching said sub-assembly to said frame to thereby normally prevent rotation of said sub-assembly on said frame, said frangible means being readily broken when said moldboard strikes an obstacle such as a boulder, to thereby allow subsequent pivotal movement of said sub-assembly.

References Cited in the file of this patent

UNITED STATES PATENTS

| Number | Name | Date |
|---|---|---|
| 207,626 | Sargent | Sept. 3, 1878 |
| 314,609 | Schenk | Mar. 31, 1885 |
| 396,397 | Gaylord | Jan. 22, 1889 |
| 472,179 | Savits | Apr. 5, 1892 |
| 487,142 | Estes | Nov. 29, 1892 |
| 587,512 | Sevier | Aug. 3, 1897 |
| 715,282 | McLaughlin | Dec. 9, 1902 |
| 1,090,134 | Caughey | Mar. 17, 1914 |
| 1,276,720 | Carpenter | Aug. 27, 1918 |
| 1,289,891 | Paulson | Dec. 31, 1918 |
| 1,468,388 | Moore | Sept. 18, 1923 |
| 1,539,066 | Adamy | May 26, 1925 |
| 1,628,372 | Strandlund | May 10, 1927 |
| 1,740,519 | Miller | Dec. 24, 1929 |
| 1,797,501 | Glasier | Mar. 24, 1931 |
| 1,860,534 | Glasier | May 31, 1932 |
| 1,867,517 | Lofstrand | July 12, 1932 |
| 2,044,205 | Bruner | June 16, 1936 |
| 2,161,714 | Lindelof | June 6, 1939 |
| 2,214,702 | Seaman | Sept. 10, 1940 |
| 2,300,446 | Fidler | Nov. 3, 1942 |
| 2,517,721 | Schleper | Aug. 8, 1950 |